May 23, 1967     D. I. CROPP ET AL     3,321,606

HEADER FOR WIRES

Filed June 22, 1964     2 Sheets-Sheet 1

INVENTORS
DAVID I. CROPP
CHALMER C. JORDAN
ROBERT W. LINGO

BY Charles L. Lovercheck
ATTORNEY

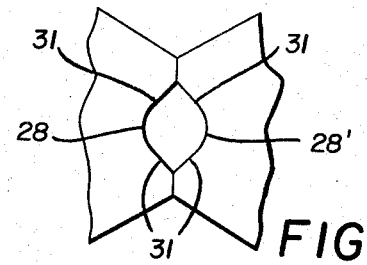
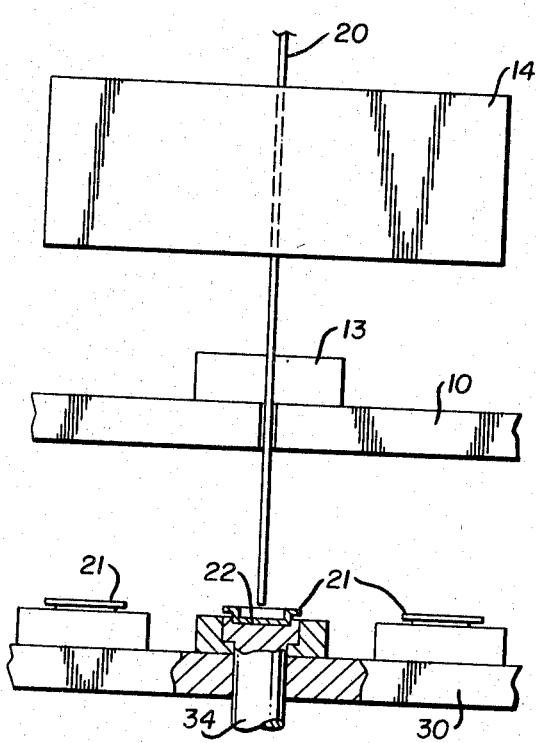
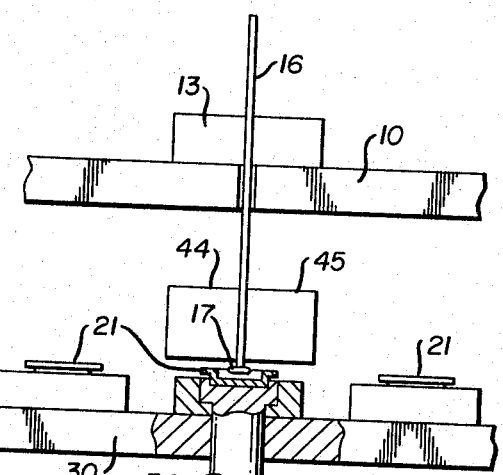
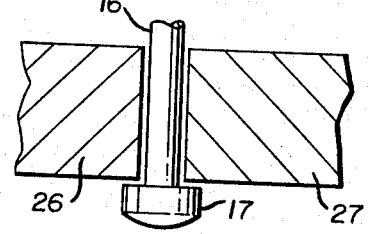
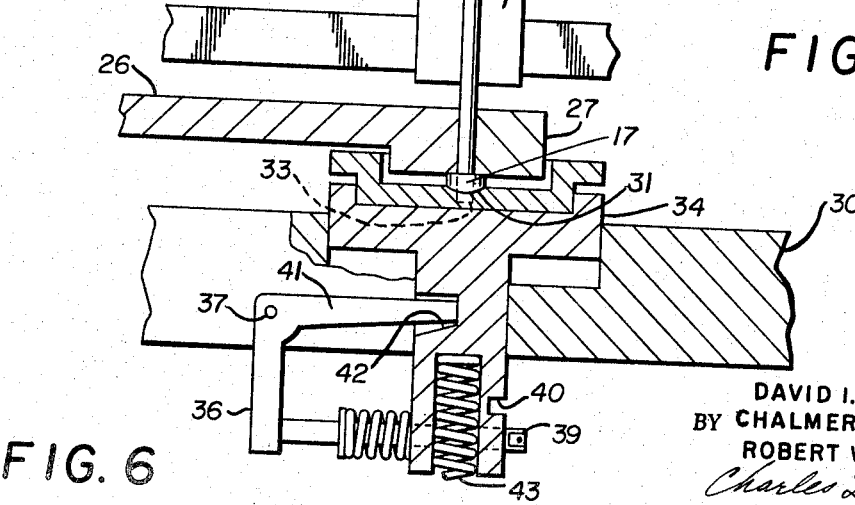

United States Patent Office 3,321,606
Patented May 23, 1967

3,321,606
HEADER FOR WIRES
David I. Cropp, Meadville, Chalmer C. Jordan, Saegertown, and Robert W. Lingo, Meadville, Pa., assignors to Glass-Tite Industries, Inc., Providence, R.I., a corporation of Rhode Island
Filed June 22, 1964, Ser. No. 376,853
7 Claims. (Cl. 219—79)

This invention relates to machines for forming heads on cut pieces of wire and for welding the headed wire to another member.

Previous machines according to the present invention capable of performing the function of the machine disclosed herein were complicated and inefficient.

In the present machine, short measured pieces of wire are cut from a roll of wire, held firmly between jaws having a particular shaped wire engaging surface, and the wire is struck on its lower end by an impact member to form a head of an efficient shape. The wire is then released from the jaws in a unique manner, moved to position over prepositioned cup shaped members, and then welded to the cup shaped member by a welding technique wherein the head formed on the wire conducts most or all of the electricity for welding whereby the body of the wire is not heated.

It is, accordingly, an object of the present invention to provide an improved heading and welding machine.

Another object is to provide an improved wire holding mechanism for a heading device.

Another object of the invention is to provide a machine wherein a particular shaped head is formed which is positioned for efficient welding to a member.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

FIG. 4 is an enlarged view showing the heading member;

FIG. 5 is a partial cross sectional view taken on line 5—5 of FIG. 1;

FIG. 6 is a partial cross sectional view taken on line 6—6 of FIG. 1;

FIG. 7 is a partial cross sectional view taken on line 7—7 of FIG. 1; and

FIG. 8 is an enlarged view of a headed wire.

Figure 1:
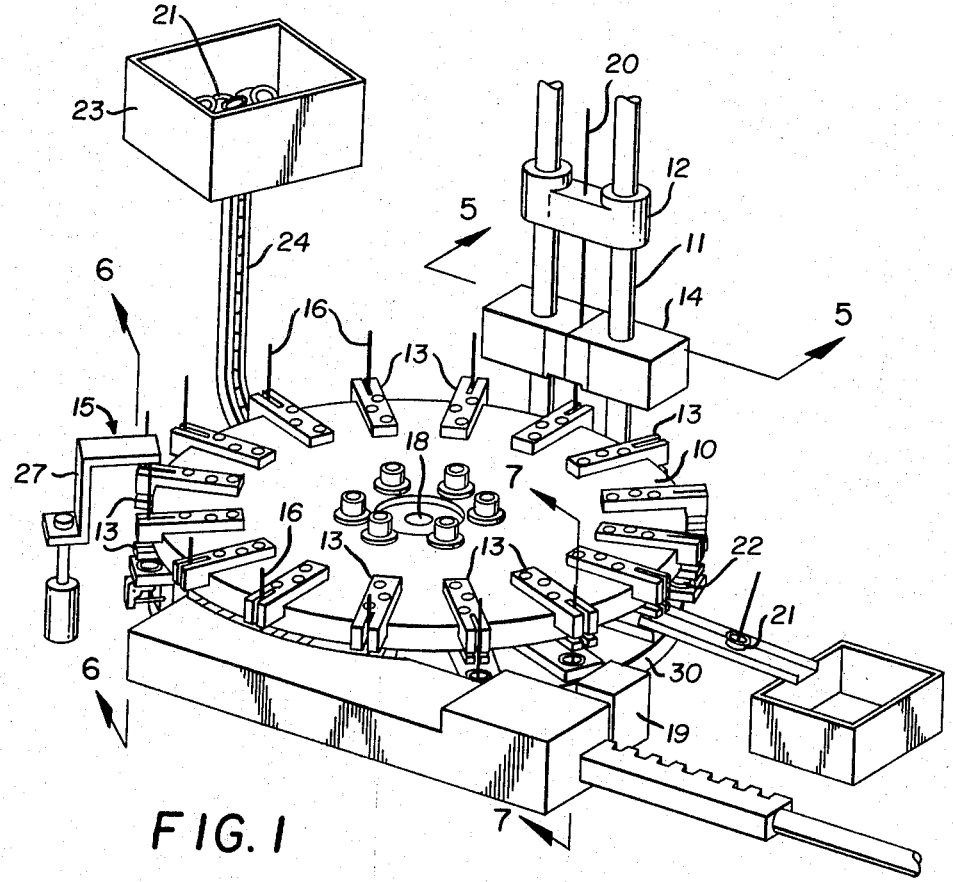
FIG. 1 is an isometric view of a machine according to the invention.
Figure 2:
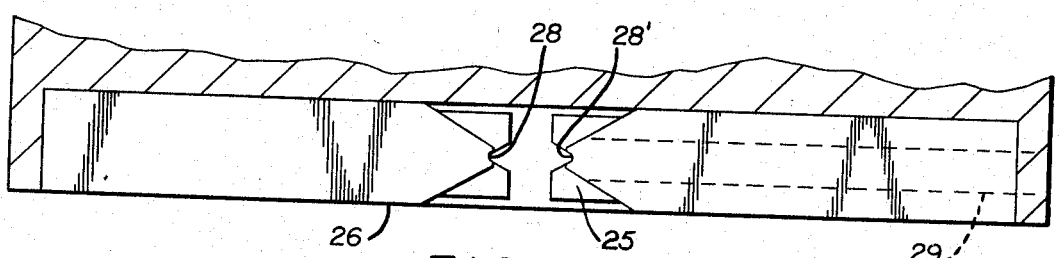
FIG. 2 is a top schematic view of the jaws which hold and clamp the wire during the heading operation.
Figure 3:
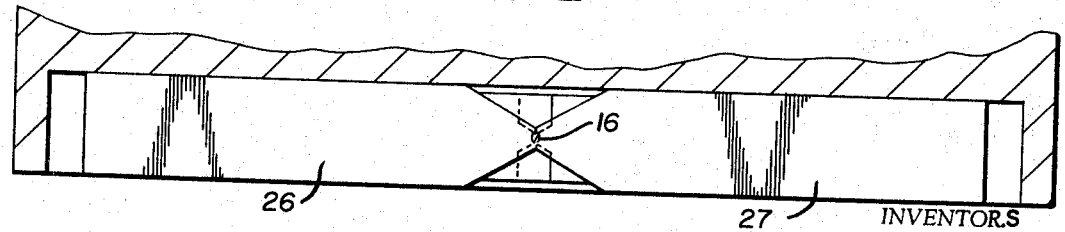
FIG. 3 is a top view of the jaws of the header showing the jaws in closed position.

Now with more particular reference to the drawings, the machine shown has an upper table 10 and a lower table 30 supported on and fixed to a common central shaft 18 and driven by an indexing mechanism similar to that shown in Patent No. 3,128,529. The indexing mechanism advances the tables an arc equal to the spacing between two of the jaws 13. The machine shown performs three functions. It cuts and straightens the wire on the mechanism which has the vertical ways and sliding, measuring, and cutting members at 12 and 14 which is similar to that shown in the said patent. This cuts the wire 20 to lengths. A heading station 15 is provided and a welding station 19. The function of the machine is to form heads 17 on the cut pieces of wire and weld the heads to the inside of the cup shaped members 21.

The cup shaped members 21 are fed to the sockets 22 in the lower table 30 by the vibratory feeder 23. The vibratory feeder 23 may be of a conventional type familiar to those skilled in the art. The feeder 23 feeds the cup shaped members down the track 24 and they are positioned in the circumferentially spaced sockets 22 on the lower table and advanced with the table 30 to a position under the welder 19.

The cut pieces of wire 16 which are straightened, measured, and cut at station 11 are moved to the heading position at 15. Here, the wire is pushed down by push down arm 27 so that it slides through the wire jaws 13 on the table into position in the notch 28 in the fixed jaw 26. The rack 29 reciprocates and moves the movable jaw 25 into clamping position on the wire. The notches 28 and 28' have an arcuate central portion which are of slightly smaller radius than the radius of the wire. The edges of the notches are slightly ellipsoidal in shape at 31 so that the wire, when clamped between the arcuate portion, is distorted and moved out into the portion 31 but the wire is not stretched beyond its elastic limit during this distortion. Therefore, the wire is not deformed even though it is held firmly in clamped relation.

The wire is pushed down by the push down arm 27 so that it extends down to the dotted line position 33 and the amount at 33, FIG. 6, which extends below the jaws 26 and 27 is sufficient in volume to form the head 17.

The heading is done by the impact member 34 which reciprocates up and down. The impact member 34 is shown in the heading position in full lines in FIG. 6. The arm 36 is pivoted around the pivot pin 37 and can move the impact member 34 down so that the trigger mechanism 39 engages the notch 40. This is done by the arm 41 which is moved into the notch 42 and urges the trigger mechanism 34 down. Then when the arm 36 moves to the normal position, the trigger 39 is moved out of the notch 40 and the spring 43 dissipates its stored energy and drives the impact member 34 up to form the head.

When the head is formed, the movable jaw 27 is first opened slightly as shown in FIG. 8 to relieve the pressure on the wire 16. The wire 16 is then pushed down a few thousandths of an inch so that the head is released thoroughly from the jaws. Then the table indexes and brings the wire step by step to the welding position 19. The wire is then closed between the jaws 44 and 45 where it is loosely held and the jaws 44 and 45, FIG. 7, are moved downwardly until the lower edge on the jaws engages the upper surface of the head. This forces the head 17 down into firm engagement with the bottom of the cup and most of the contact is between the shoulder formed by the upper surface of the head around the wire and the bottom of the jaws. Thus, most of the electricity flows through the head. When the welding is done, the cup with the wire welded thereto is lifted out and dropped into a suitable repository.

The steps carried out in the machine are thus:
(1) The wire is indexed to the heading location.
(2) The wire is pushed down to a given position to result in a given head diameter.
(3) The movable jaw is moved into clamping relation with the fixed jaw.
(4) The striking mechanism is released to form the head.
(5) The movable jaw is released so that little pressure rests on the wire.
(6) The wire is pushed down to break the upper edge of the head loose from the jaw approximately .005 inch.
(7) The movable clamping jaw is opened.
(8) The table indexes to move the headed part out and a new lead in.

This process and the machine that carries it out make it possible to make heads economically, rapidly and efficiently.

The foregoing specification sets forth the invention in its preferred practical form but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for forming a head on the end of wire comprising
    heading means having two jaws, one movable relative to the other,
    said jaws each having a surface engaging the other,
    a groove in each said jaw,
    said grooves each defining a space generally having the the cross sectional shape of one half of said wire,
    said shape being of lesser dimension axially and of greater dimension laterally than said wire diameter defining a space lateral of said wire and receiving said wire as it is distorted and its material is moved from an axial position to a lateral position an amount less than its yield point when said jaws are closed.

2. The machine recited in claim 1 wherein said wire is rounded in cross section and said space defined by said grooves is substantially elliptical in cross section.

3. A machine for forming a head on the end of wire comprising
    two jaws, one movable relative to the other,
    said jaws each having a surface engaging the other,
    a groove in each said jaw,
    said grooves together forming a space generally having the cross sectional shape of said wire,
    said shape being of lesser dimension in a direction toward the bottom of said groove and of greater dimension in a direction laterally of said groove than the diameter of said wire providing a space at each side of said wire to receive the material of said wire as it is distorted less than its yield point into said spaces when said jaws are closed,
    means on said machine to move an end of said wire a distance from said jaws sufficient to form a head on said wire,
    an impact means to engage the end of said wire to form said head.

4. The machine recited in claim 3 wherein
    said means to form said head comprises a mechanical hammer having a spring attached thereto,
    said hammer being adapted to store energy from said spring and having means to cause said hammer to strike said wire end forming said head and thereby dissipating said energy.

5. The machine recited in claim 4 wherein
    said machine has a table thereon,
    means to cut said wire into pieces of predetermined length,
    means on said table to move said wires to said heading means,
    said jaws being adapted to grasp said wire when it is moved to said heading means.

6. The machine recited in claim 5 wherein
    said table has a means therein to carry members to weld to said wire,
    and means on said machine to bring said head to said members and to weld it thereto.

7. A machine for forming heads on pieces of wire and welding said heads to cuplike members comprising
    means on said machine to cut said wires,
    heading means,
    means on said machine to move said cut wires to said heading means,
    impact means to form heads on said wires,
    means on said machine to locate said cuplike members relative to said wires, with the inside open end of said cuplike members facing said wires,
    and means to move said head of said headed members into said cuplike members and into engagement with the bottom thereof and move to weld said wires to said bottom of said cuplike members.

References Cited by the Examiner

UNITED STATES PATENTS

| | | | |
|---|---|---|---|
| 396,010 | 1/1889 | Thomson | 219—151 |
| 1,417,806 | 5/1922 | Lapotterie | 219—152 |
| 2,951,933 | 9/1960 | Erskine et al. | 228—13 X |

RICHARD M. WOOD, *Primary Examiner.*

A. BARTIS, *Examiner.*

B. A. STEIN, *Assistant Examiner.*